(12) United States Patent
Waynick

(10) Patent No.: US 7,364,599 B2
(45) Date of Patent: *Apr. 29, 2008

(54) METHODS FOR INCREASED REMOVAL OF DRAG REDUCER ADDITIVES FROM LIQUID HYDROCARBON FUEL

(75) Inventor: John Andrew Waynick, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 589 days.

This patent is subject to a terminal disclaimer.

(21) Appl. No.: 10/795,687

(22) Filed: Mar. 8, 2004

(65) Prior Publication Data

US 2004/0249233 A1    Dec. 9, 2004

Related U.S. Application Data

(63) Continuation-in-part of application No. 10/453,803, filed on Jun. 3, 2003, now Pat. No. 7,018,434.

(51) Int. Cl.
*C10L 1/12* (2006.01)
*B01D 21/01* (2006.01)

(52) U.S. Cl. .................... 44/457; 44/903; 210/728; 436/60

(58) Field of Classification Search ............... 44/457, 44/903; 210/728; 436/60
See application file for complete search history.

(56) References Cited

U.S. PATENT DOCUMENTS

| | | | |
|---|---|---|---|
| 1,198,039 A | 9/1916 | Krause | |
| 2,546,903 A | 3/1951 | Morrell | |
| 2,744,938 A | 5/1956 | Urban, Jr. | |
| 2,762,852 A | 9/1956 | Litton | |
| 3,366,852 A | 1/1968 | Adams et al. | |
| 3,977,969 A | 8/1976 | Zall | |
| 4,451,377 A | 5/1984 | Luxemburg | |
| 4,502,957 A | 3/1985 | Jehle et al. | |
| 4,508,851 A | 4/1985 | Izumi et al. | |
| 4,527,581 A | 7/1985 | Motier | |
| 4,599,117 A | 7/1986 | Luxemburg | |
| 4,720,397 A | 1/1988 | O'Mara et al. | |
| 4,747,855 A | 5/1988 | Hirai et al. | |
| 4,758,354 A | 7/1988 | O'Mara et al. | |
| 4,837,249 A | 6/1989 | O'Mara et al. | |
| 5,165,440 A | 11/1992 | Johnston | |
| 5,225,081 A | 7/1993 | Brownawell | |
| 5,244,937 A | 9/1993 | Lee et al. | |
| 5,376,697 A | 12/1994 | Johnston et al. | |
| 5,449,732 A | 9/1995 | Smith et al. | |
| 5,504,132 A | 4/1996 | Smith et al. | |
| 5,539,044 A | 7/1996 | Dindi et al. | |
| 5,733,953 A | 3/1998 | Fairchild et al. | |
| 5,736,053 A | 4/1998 | Ikushima et al. | |
| 5,788,865 A | 8/1998 | Smirnov et al. | |
| 5,833,862 A | 11/1998 | Holland | |
| 5,884,777 A | 3/1999 | Pan et al. | |
| 5,888,402 A | 3/1999 | Hommeltoft et al. | |
| 5,891,324 A | 4/1999 | Ohtsuka | |
| 5,893,398 A | 4/1999 | Garrett, Jr. | |
| 5,900,153 A | 5/1999 | Sanford | |
| 6,024,880 A | 2/2000 | Ciora, Jr. et al. | |
| 6,027,653 A | 2/2000 | Holland | |
| 6,042,722 A | 3/2000 | Lenz | |
| 6,056,805 A | 5/2000 | Litwin et al. | |
| 6,082,392 A | 7/2000 | Watkins, Jr. | |
| 6,103,127 A | 8/2000 | Pourfarzaneh | |
| 6,599,337 B2 * | 7/2003 | Waynick ............... | 44/903 |
| 7,018,434 B2 * | 3/2006 | Waynick ............... | 44/457 |
| 2003/0019149 A1 | 1/2003 | Waynick | |
| 2004/0015034 A1 | 1/2004 | Waynick | |
| 2004/0244280 A1 | 12/2004 | Waynick | |
| 2005/0193622 A1 | 9/2005 | Waynick | |

FOREIGN PATENT DOCUMENTS

| | | |
|---|---|---|
| GB | 1236066 | 6/1971 |
| WO | WO 02/086030 A1 | 10/2002 |
| WO | WO 2004/108862 A1 | 12/2004 |
| WO | WO 2005/086803 A2 | 9/2005 |
| WO | WO 2005/086809 A2 | 9/2005 |

OTHER PUBLICATIONS

Research Disclosure 238001, Feb. 10, 1984.*
The International Bureau of WIPO, International Preliminary Report on Patentability, PCT/US2005/007545, Sep. 21, 2006, 5 pgs.
U.S. Commissioner of Patents and Trademarks, International Preliminary Examination Report, PCT/US02/12302, Mar. 10, 2003, 4 pgs.
U.S. Commissioner of Patents and Trademarks, International Search Report and Written Opinion, PCT/US05/07572, Sep. 29, 2006, 6 pgs.
U.S. Commissioner of Patents and Trademarks, International Search Report and Written Opinion, PCT/US05/07542, Oct. 2, 2006, 6 pgs.
Natalie Marchildon, et al. The AA Graphite Deposit, Bella Coola Area, British Columbia: Exploration Implications For The Coast Plutonic Complex. (92M/15) Geological Fieldwork 1992, Paper 1993-1 p. 389-397. http://www.em.gov.bc.ca/DL/GSBPubs/GeoFldWk/1992/389-398-marchildon.pdf.
Edward Matulevicius. Fuel Technology Associates. Effect of Pipeline Drag Reducer Additive on Coalescence & Filtration in Aviation Fuels. A Plan for Determining the Effect of Fully Sheard pipeline Drag Reducer Additives on Filter/Separators and Monitors. Apr. 9, 2001 http://www.crcao.com/aviation/Presentation%202001 CRC%20Final%20PDR%20Plan.pdf.

* cited by examiner

*Primary Examiner*—Cephia D. Toomer
(74) *Attorney, Agent, or Firm*—The Morris Law Firm, P.C.

(57) ABSTRACT

A method for increasing removal of drag reducer additive (DRA) from liquid hydrocarbon fuel. The method comprises producing contaminated liquid hydrocarbon fuel comprising a concentration of removable DRA comprising a quantity of one or more polar groups, and contacting the contaminated liquid hydrocarbon fuel with an amount of one or more removal agents under removal conditions effective to produce a reduced concentration of the removable DRA.

77 Claims, No Drawings

METHODS FOR INCREASED REMOVAL OF DRAG REDUCER ADDITIVES FROM LIQUID HYDROCARBON FUEL

CROSS REFERENCE TO RELATED APPLICATIONS

The present application is a continuation-in-part of U.S. patent application Ser. No. 10/453,803, filed Jun. 3, 2003, published as US-2004-0015034-A1 on Jan. 22, 2004, pending. The present application also is related to U.S. Pat. No. 6,599,337, issued Jul. 29, 2003. Each of the foregoing references is incorporated herein by reference.

FIELD

The application relates to methods for increasing removal of drag reducer additives ("DRA's") from liquid hydrocarbon fuel.

BACKGROUND OF THE APPLICATION

DRA is added to flowing fluids in order to reduce the energy lost due to friction, or drag, thus permitting the movement of more fluid at the same differential pressure. The resulting reduction in frictional pressure drop improves pumping efficiency, lowers energy costs, and increases profitability.

Unfortunately, whether in the virgin form or in the sheared or partially sheared form, and despite the fact that DRA intentionally is added to certain fuels, DRA nonetheless is a "contaminant" in liquid hydrocarbon fuels, and has the potential to cause a number of problems. The presence of DRA in aviation turbine fuel may result in downgrading of an entire batch to non-aviation kerosene or diesel fuel, both of which generally have less market value than aviation turbine fuel.

Simple and inexpensive methods are needed for removing DRA from liquid hydrocarbon fuels.

SUMMARY

The application provides a method for increasing removal of drag reducer additive (DRA) from liquid hydrocarbon fuel. The method comprises producing contaminated liquid hydrocarbon fuel comprising a concentration of removable DRA comprising a quantity of one or more polar groups, and contacting said contaminated liquid hydrocarbon fuel with an amount of one or more removal agents under removal conditions effective to produce a reduced concentration of the removable DRA.

DETAILED DESCRIPTION

The present application provides methods for producing increased removal of DRA from liquid hydrocarbon fuel by removal agents effective to bind polar groups.

Removal Agents for Removing DRA from Fuels

A number of materials have been identified as effective removal agents for removing DRA from liquid hydrocarbon fuels, preferably motor gasoline and jet fuels, most preferably jet fuels. Effective removal agents for DRA, including polyalphaolefin DRA, include but are not necessarily limited to carbonaceous materials, including but not necessarily limited to selected activated carbons and graphites. See U.S. Pat. No. 6,599,337, incorporated herein by reference. The present application provides a method for increasing removal of DRA using activated carbons, graphites, attapulgus clay, and any removal agent effective to bind polar groups.

Without limiting the application to a particular theory or mechanism of operation, the more active DRA removal agents are believed to comprise ducts or pores having a hydrophobic/hydrophilic property that attracts polar pendant groups on the DRA. The attraction is believed to bring the pendant groups on the DRA into proximity and orientation with the pore surface of the agent, thereby immobilizing the pendant groups. When many pendant groups on a given drag reducer molecule are simultaneously immobilized, the drag reducer molecule is strongly immobilized.

If it is known that a particular type of removal agent is to be used at a given location to remove DRA, the DRA may be tested for removal by that specific removal agent and, if insufficient removal is achieved, removable DRA may be used as described herein.

"Liquid Hydrocarbon Fuel"

By "liquid hydrocarbon fuel" is meant any hydrocarbon that is liquid under conditions of transport and/or storage. Suitable liquid hydrocarbon fuels include, but are not necessarily limited to those having a boiling range of from about 150° F. to about 750° F., which may be used as a fuel. In one embodiment, the liquid hydrocarbon fuel is selected from the group consisting of liquefied natural gas (LNG), liquefied petroleum gas (LPG), motor gasoline, aviation gasoline, distillate fuels such as diesel fuel and home heating oil, kerosene, jet fuel, No. 2 oil, residual fuel, No. 6 fuel, or bunker fuel. In a preferred embodiment, the liquid hydrocarbon fuel is selected from the group consisting of diesel fuel, jet fuel, aviation gasoline, and motor gasoline. In a more preferred embodiment, the liquid hydrocarbon fuel is jet fuel, at least in part due to the stringent requirements applicable to jet fuel and DRA. The phrase "jet fuel" refers to both commercial jet fuel (Jet A, Jet A-1, and Jet B) and military jet fuel, such as JP-4, JP-5, JP-8 and the like.

"Removable" Drag Reducer Additive

The application provides a method in which "removable DRA" is used to reduce drag in liquid hydrocarbon fuels. The "removable DRA" is then removed from the fuel to which it was intentionally added, or to another fuel in which the DRA was an unintentional contaminant.

"Removable DRA" is DRA comprising a quantity of polar groups. The quantity of polar groups is effective to produce a greater amount of removal than the amount of polyalphaolefin DRA that would be removed using the same one or more removal agents under the same removal conditions. As used herein, the phrase "polyalphaolefin DRA" refers to a DRA consisting essentially of carbon and hydrogen and comprising up to a single terminal unsaturated carbon-carbon bond.

Preferably, the quantity of polar groups on the removable DRA is effective to produce 2% or more greater removal than the amount of polyalphaolefin DRA that would be removed using the same one or more removal agents under the same removal conditions. More preferably, the amount of polar groups are effective to produce 5% or more greater removal, more preferably 10% or more greater removal, even more preferably 15% or more greater removal than the amount of polyalphaolefin DRA that would be removed using the same one or more removal agents under the same removal conditions.

Removal agents which have demonstrated an absorption capacity for polalphaolefins of about 0.03 wt. % include, but are not necessarily limited to GRAPHITE 2139, GRAPHITE 3726, GRAPHITE 3739, GRAPHITE 5539, GRAPHITE 9039, and GRAPHITE GA-17, which are commercially available available from Superior Graphite Co.

"Removable DRA" is DRA comprising polar groups which can be made using any method, including, but not necessarily limited to: methods used to make conventional DRA's which inherently comprise a sufficient quantity of polar groups; methods to synthesize conventional DRA which otherwise does not comprise a sufficient quantity of polar groups to incorporate one or more monomers comprising polar groups; and, methods for modifying DRA after synthesis to include a sufficient quantity of one or more polar groups.

Examples of removable DRA's whose synthesis can be modified and/or which may be modified after synthesis to comprise a sufficient quantity of polar groups include, but are not necessarily limited to those described in the following patents or published applications, each of which is fully incorporated herein by reference: U.S. Pat. No. 5,252,692; U.S. Pat. No. 3,471,273; U.S. Pat. No. 4,881,566; U.S. Pat. No. 6,410,671; WO 99/57162. Suitable DRA's include, but not necessarily limited to alkyl styrenes; polymers of alpha-olefins, isobutylenes, and alkyl acrylates; and, combinations thereof. Alpha olefins which typically are used to produce polyalphaolefins, include, but are not necessarily limited to such 1-hexene, 1-octene, 1-decene, 1-dodecene, 1-tetradecene, isobutylene.

Preferred DRA's for modification according to the present application include, but are not necessarily limited to "polyalphaolefins," which are non-polar long-chain polyolefin polymers. Suitable polyalphaolefins have a "peak" molecular weight sufficiently high to allow the polymers to reduce fluid flow drag. Suitable polyalphaolefins are believed to have a molecular weight of about 1 million Daltons or more, more preferably about 10 million Daltons or more, most preferably about 25 million Daltons or more. The "peak" molecular weight refers to the peak that typically is measured as the drag reducer is eluted and detected during gel permeation chromatography.

Suitable polyalphaolefins comprise polymerized linear alpha olefin (LAO) monomers having from about 2 to about 40 carbon atoms, preferably from about 2 to about 30 carbon atoms, more preferably from about 4 to about 20 carbon atoms, most preferably from about 6 to about 12 carbon atoms. An especially preferred embodiment of DRA which maybe be modified to form "removable DRA" comprises at least two different LAO's, preferably having from about 6 to about 12 carbon atoms, the number of carbon atoms of the "at least two different LAO's" differing by 6.

Polyalphaolefins having relatively high molecular weights are required to impart good drag reduction. Suitable polyalphaolefin DRA's are made by a variety of processes, including but not necessarily limited to solution polymerization and bulk polymerization. Bulk polymerization is said to produce "ultra-high molecular weight polyolefin drag reducers [that] are significantly larger (molecular weight basis) than the best molecular weights made by solution polymerization." See U.S. Pat. No. 5,504,132. Preferred poly(alpha olefin) DRA's are made by solution polymerization.

Commercially available DRA's which may be rendered "removable" include, but are not necessarily limited to, CDR® Flow Improver, REFINED POWER™, AND REFINED POWER II™, manufactured by ConocoPhillips, EN-660 Flow Improver, manufactured by Energy 2000 LLC, and the FLO® line of drag reducer additives, such as FLO®XS and FLO®XL, manufactured by Baker Petrolite.

As liquids containing DRA travel through pumps, pipelines and other equipment, the DRA typically degrades through shearing action, resulting in a reduction in the molecular weight of the DRA. The degraded DRA is generally sheared or partially sheared DRA. Upon reaching the ultimate destination, liquid hydrocarbon fuels that have been shipped using DRA may contain a significant amount of DRA, including that in the sheared and partially sheared form. Removable DRA's preferably are removed in both their sheared and unsheared forms.

The DRA may comprise other components as well as the polymer, itself. Examples of such components include, but are not necessarily limited to surfactant, catalyst residue, other additives, and other byproducts from the production of the polymer.

At least activated carbons, graphites, and attapulgus clays are believed to operate by attracting polar groups on the DRA. Therefore, preferred "removable DRA's" comprise polar groups other than the single terminal unsaturated carbon-carbon bond of polyalphaolefins mentioned above. Examples of suitable organic polar groups include, but are not necessarily limited to groups comprising one or more moieties selected from the group consisting of oxygen, sulfur, nitrogen, halogen, phosphorus, unsaturated carbon-carbon bonds other than a single terminal unsaturated carbon-carbon bond of a polyalphaolefin, and combinations thereof.

Examples of suitable groups comprising oxygen include, but are not necessarily limited to hydroxyl groups, carbonyl groups, carboxyl groups, either groups, ester groups, epoxide groups, salts thereof, groups comprising the foregoing groups, and combinations thereof. Suitable groups include, but are not necessarily limited to a) acrylic acid and acrylic acid salts of the following general formula:

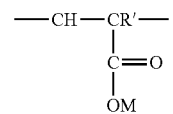

where R' is H or an alkyl group and M is selected from the group consisting of hydrogen, a metal, and a nitrogen-containing base such as an amine. M also can be a hydrocarbyl moiety, in which case the entire group is an ester.

Examples of suitable groups comprising sulfur include, but are not necessarily limited to thiols, carbonyl sulfides, sulfonic acid groups, sulfonates, sulfonides, groups comprising the foregoing groups, and combinations thereof.

Examples of suitable groups comprising nitrogen include, but are not necessarily limited to ammonium groups, amine groups, N-substituted amine groups, amide groups, N-substituted amide groups, amidine groups, N-substituted amidine groups, acidic groups carried by substituents of N-acrylamide, N-methaacrylamide, N-acrylamidine or N-methacrylamidine, nitrile groups, guanidine groups, groups comprising the foregoing groups, and combinations thereof. Preferred N-substituted amide and N-substituted amidines are N-substitutes containing polar groups other than primary amines. Preferred amines are tertiary amines and quaternary ammonium salts.

Suitable N-substituted groups include, but are not necessarily limited to groups having the following general formula:

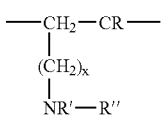

where R, R', R" are selected from the group consisting of hydrogen and alkyl groups and x is from about 0 to about 40.

Suitable N-substituted acrylamide or methacrylamide groups include, but are not necessarily limited to groups having the following general formula:

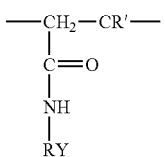

where R' is H or an alkyl and R is an organic substituent with at least one carbon and Y is COOM, —SO$_3$ M or —OSO$_3$ M in which M is selected from the group consisting of hydrogen, a metal, and a nitrogen-containing base such as an amine.

Suitable acryl- or methacrylaminidines include, but are not necessarily limited to groups having the following general formula:

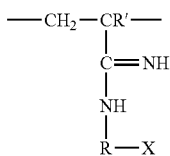

where R' is H or an alkyl and R is an organic substituent with at least one carbon atom and X is H or a non-ionic or ionic substituent. The character of the substituent X is not particularly essential. Suitable non-ionic substituents for X may be oxygen-containing substituents such as —OH, —OR, esters, saccharides, epoxides, alkyls having from about 4 to 24 carbon atoms, silicon containing substituents, such as [Si(R$_2$)—O]$_n$—SiR$_3$ where n is from about 0 to about 100 and R is an alkyl having from about 4 to 24 carbons, nitro-groups, nitroso groups, lactone groups, lactame groups, nitrile groups, and others. Suitable cationic groups X include, but are not necessarily limited to primary, secondary and tertiary amines and their salts, salts of quaternary bases, pyridine derivatives, naphtyridine derivatives, guanidines, amidines, etc. Suitable anionic groups X include, but are not necessarily limited to —COOM, —SO$_3$ M, —OSO$_3$ M or —OPO$_2$ OM in which M includes, but is not necessarily limited to hydrogen, metal-containing bases, and nitrogen-containing bases (such as an amine).

Examples of suitable phosphorus containing groups include, but are not necessarily limited to oxygenated phosphorus groups, halogenated phosphorous groups, groups comprising the foregoing groups, and combinations thereof. Examples include, but are not necessarily limited to phosphine groups, phosphate groups, phosphoric acid groups, groups comprising the foregoing groups, and combinations thereof. Note that many of the foregoing groups also comprise oxygen.

Suitable unsaturated groups comprising unsaturated carbon-carbon bond(s) include, but are not necessarily limited to alkenyl groups, alkynyl groups, aromatic groups, diallyl compounds, preferably diallyl ammonium compounds, ethylenically unsaturated carboxylic esters and carboxylic amides and copolymers thereof, groups comprising the foregoing groups, and combinations thereof. Examples of suitable ethylenically unsaturated carboxylic esters and carboxylic amides include, but are not necessarily limited to copolymers (including ter and higher polymers) having structural units derived from monomers which are (A) at least one ethylenically unsaturated alcohol, carboxylic acid or ester, with at least one of (B) an ethylenically unsaturated carboxylic ester with a polar group in the ester, and (C) an ethylenically unsaturated carboxylic amide. See WO 99/57162, which has been incorporated herein by reference. The acid may be a mono, di, or tricarboxylic acid, including but not necessarily limited to fumaric, maleic, and crotonic acids.

Examples of suitable polar groups include, but are not necessarily limited to acetate groups, acrylate groups, acrylamide groups, zwitterionic groups, epoxide groups, metal silicate salt groups, alkyl propane sulfonic acid groups, N-sulfoalkyl-N-alkacroyloxyalkyl groups, N,N-dialkyl-ammonium betaine (IV) groups, groups comprising quaternary salts of dialkylamino alkyl alkacrylates, poly (dialkylamino alkylacrylamide groups, poly (dialkylamino alkylacrylamide) groups, (3-acrylamido-3-alkyl) alkylpolyalkylammonium chloride groups, 2-acrylamido-2-alkylpropane sulfonic acid groups, and dialkyldiallyl ammonium chloride groups, alkyl styrene sulfate groups, carboxyvinyl groups, vinyl acrylamide groups, carboxymethyl-cellulose groups.

Specific examples of the foregoing groups include, but are not necessarily limited to sodium silicate groups, calcium silicate groups, magnesium silicate groups, iron silicate groups, aluminum silicate groups, alkyl-poly(etheroxy) acrylate groups, methyl propane sulfonic acid groups, N-3-sulfopropyl-N-methacroyloxyethyl-N,N-dimethyl-ammonium betaine (VI) groups, quaternary salts of dimethylamino alkyl methacrylates, quaternary salts of dimethylamino alkylmethacrylamide groups, poly (dimethylamino methylacrylamide) groups, (3-acrylamido-3-methyl) alkylpolyalkylammonium chloride groups, 2-acrylamido-2-methylpropane sulfonic acid groups, and dimethyldiallyl ammonium chloride groups, methyl styrene sulfate groups, carboxyvinyl groups, vinyl acrylamide groups, carboxymethylcellulose groups hydroxyethylcellulose groups, alkylpoly (etheroxy) acrylate groups, methyl propane sulfonic acid, N-(3-sulfopropyl-N-methacroyloxyethyl-N,N-dimethyl-ammonium betaine (VI) groups, quaternary salts of dimethylaminoethyl methacrylate and dimethylaminopropyl methacrylamide groups, poly (dimethylamino methylacrylamide) groups, (3-acrylmido-3-methyl) butyltrimethylammonium chloride groups, 2-acrylamido-2-methylpropane sulfonic acid groups, dimethyldiallyl ammonium chloride groups, and, methacrylamido propyl trimethyl ammonium chloride, organic electrolyte such as cetyltrimethylammonium salicylate and sodium salicylate; cetyltrimethylammonium 3,4,-dichlorobenzoate and sodium 3,4-dichlorobenzoate; and tetradecyltrimethylammonium salicylate and sodium salicylate. Another drag reducer is formed by the reaction product of a hydroxy ether and a pentavalent phosphorous compound with a short chain and or long chain alcohol.

Suitable zwitterion groups have the following general structure:

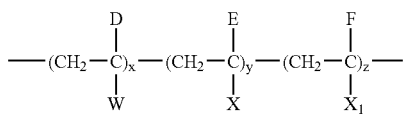

wherein

W is a CONH$_2$ or CONHR or CONHRR' or COO' or COOR" group, where R, R' and R" are linear or branched aliphatic radicals;

x, y, and z are molar percentages, y+z not equal to zero;

D, E and F are an atom of hydrogen or a methyl group, X and X' correspond to one of the following two formulas;

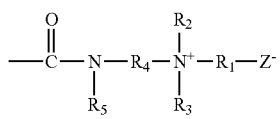

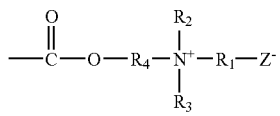

wherein $R_2$ and $R_3$ are each a monovalent hydrocarbon radical;

$R_1$ is a divalent organic group comprising a linear chain consisting of carbon atoms, containing 3 to 12 atoms in linear chain, that can be interrupted by 1 nitrogen atom carrying an amide function or by 1 to 3 oxygen atoms and comprising possibly alkyl or hydroxyl substituents;

$R_4$ is a linear or branched aliphatic group and $R_5$ is a hydrocarbon radical;

Z' meets at least one of the following formulas corresponding to sulfobetaines and phosphobetaines respectively:

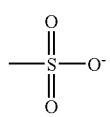

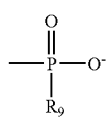

wherein $R_9$ is a methyl, phenyl or alkoxy radical, in cases where synthesis is carried out in the absence of salts:

(y+z)max=40%, in the case of phosphobetaines and of synthesis in the presence of salts (y+z)max=100%.

In the case of sulfobetaines, $R_1$ can be one of the following two formulas:

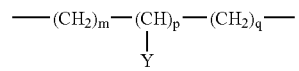

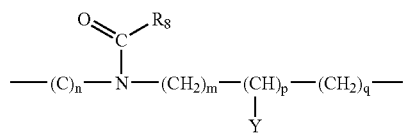

wherein $R_6$ and $R_7$ represent each a substantially hydrocarbon radical and $R_8$ a hydrogen atom or a hydrocarbon radical; n, m, p, q are integers, n is 2 or 3; Y can be a methyl or hydroxyl group; p can be 0 or 1. Provided that, when Y is a hydroxyl group, p is 1, m is 1 and q is 1; when Y is a methyl group, p is 1, m is 2 and q can be 0 or 1; when p is 0, the sum m+q is 2, 3, or 4.

In the case of phosphobetaines, $R_1$ can correspond to one of the following four formulas:

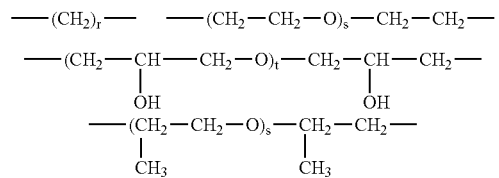

r is an integer between 3 and 12, s is an integer between 1 and 3 and t is an integer that can be 1 or 2.

Synthesis of the Zwitterion Polymers

Many of the foregoing groups are made using methods described in one or more of the following patents, each of which is incorporated herein by reference: U.S. Pat. No. 3,471,273; U.S. Pat. No. 4,881,566; U.S. Pat. No. 6,410,671; U.S. Pat. No. 5,252,692; and WO 99/57162. To the extent not described in the foregoing references, persons of ordinary skill in the art will be aware of various methods by which to add polar groups to DRA to produce removable DRA.

Where the DRA is made using monomers comprising the one or more polar group(s), the polar group(s) are of a type and at a position on the monomer(s) effective to permit adequate polymerization of functionalized monomers and non-functionalized comonomers (if present) and to produce molecules effective as DRA. For example, where the DRA is polyalphaolefin, the monomers preferably are unsaturated at the "1-" position, or at the alpha (α-) position, and the polar group(s) are separated from the unsaturation by at least 1 carbon atom. In a most preferred embodiment, the monomers are unsaturated at the α-position and the polar group(s) are at the omega (ω-) position on the monomer(s). The ω-position is the carbon atom at the opposite terminus of the monomer.

Persons of ordinary skill in the art will recognize that many modifications may be made to the foregoing without departing from the spirit and scope thereof. The embodiment described herein is meant to be illustrative only and should not be taken as limiting the invention, which is defined in the following claims.

I claim:

1. A method for increasing removal of drag reducer additive (DRA) from liquid hydrocarbon fuel, said method comprising:
   producing contaminated liquid hydrocarbon fuel comprising a concentration of removable DRA comprising a quantity of one or more polar groups other than a single terminal unsaturated carbon-carbon bond; and,
   contacting said contaminated liquid hydrocarbon fuel with an amount of one or more removal agents under removal conditions effective to produce a reduced concentration of said removable DRA.

2. The method of claim 1 wherein said reduced concentration of said removable DRA is greater than a reduced concentration of polyalphaolefin DRA removed from the same liquid hydrocarbon fuel under the same removal conditions using the same one or more removal agents, said polyalphaolefin DRA consisting of carbon and hydrogen and said single terminal unsaturated carbon-carbon bond.

3. The method of claim 1 wherein said one or more removal agents are selected from the group consisting of activated carbons, graphites, and attapulgus clay.

4. The method of claim 2 wherein said one or more removal agents are selected from the group consisting of activated carbons, graphites, and attapulgus clay.

5. The method claim 1 wherein said one or more effective removal agents comprise activated carbon.

6. The method of claim 1 wherein said one or more effective removal agents comprise attapulgus clay.

7. The method of claim 1 wherein said one or more effective removal agents comprise graphite.

8. The method claim 2 wherein said one or more effective removal agents comprise activated carbon.

9. The method of claim 2 wherein said one or more effective removal agents comprise attapulgus clay.

10. The method of claim 2 wherein said one or more effective removal agents comprise graphite.

11. The method of claim 2 wherein said reduced concentration of said removable DRA is 2% or more greater than a reduced concentration of polyalphaolefin DRA.

12. The method of claim 2 wherein said reduced concentration of said removable DRA is 5% or more greater than a reduced concentration of polyalphaolefin DRA.

13. The method of claim 2 wherein said reduced concentration of said removable DRA is 10% or more greater than a reduced concentration of polyalphaolefin DRA.

14. The method of claim 4 wherein said reduced concentration of said removable DRA is 2% or more greater than a reduced concentration of polyalphaolefin DRA.

15. The method of claim 4 wherein said reduced concentration of said removable DRA is 5% or more greater than a reduced concentration of polyalphaolefin DRA.

16. The method of claim 4 wherein said reduced concentration of said removable DRA is 10% or more greater than a reduced concentration of polyalphaolefin DRA.

17. The method of claim 1 wherein the liquid hydrocarbon fuel has a boiling range of from about 150° F. to about 750° F.

18. The method of claim 3 wherein the liquid hydrocarbon fuel has a boiling range of from about 150° F. to about 750° F.

19. The method of claim 15 wherein the liquid hydrocarbon fuel has a boiling range of from about 150° F. to about 750° F.

20. The method of claim 16 wherein the liquid hydrocarbon fuel has a boiling range of from about 150° F. to about 750° F.

21. The method of claim 1 wherein the liquid hydrocarbon fuel is selected from the group consisting of liquefied natural gas (LNG), liquefied petroleum gas (LPG), motor gasoline, aviation gasoline, distillate fuels such as diesel fuel and home heating oil, kerosene, Jet fuel, No. 2 oil, residual fuel, No. 6 fuel, or bunker fuel.

22. The method of claim 3 wherein the liquid hydrocarbon fuel is selected from the group consisting of liquefied natural gas (LNG), liquefied petroleum gas (LPG), motor gasoline, aviation gasoline, distillate fuels such as diesel fuel and home heating oil, kerosene, jet fuel, No. 2 oil, residual fuel, No. 6 fuel, or bunker fuel.

23. The method of claim 15 wherein the liquid hydrocarbon fuel is selected from the group consisting of liquefied natural gas (LNG), liquefied petroleum gas (LPG), motor gasoline, aviation gasoline, distillate fuels such as diesel fuel and home heating oil, kerosene, jet fuel, No. 2 oil, residual fuel, No. 6 fuel, or bunker fuel.

24. The method of claim 16 wherein the liquid hydrocarbon fuel is selected from the group consisting of liquefied natural gas (LNG), liquefied petroleum gas (LPG), motor gasoline, aviation gasoline, distillate fuels such as diesel fuel and home heating oil, kerosene, jet fuel, No. 2 oil, residual fuel, No. 6 fuel, or bunker fuel.

25. The method of claim 1 wherein the liquid hydrocarbon fuel is selected from the group consisting of diesel fuel, jet fuel, aviation gasoline, and motor gasoline.

26. The method of claim 3 wherein the liquid hydrocarbon fuel is selected from the group consisting of diesel fuel, jet fuel, aviation gasoline, and motor gasoline.

27. The method of claim 15 wherein the liquid hydrocarbon fuel is selected from the group consisting of diesel fuel, jet fuel, aviation gasoline, and motor gasoline.

28. The method of claim 16 wherein the liquid hydrocarbon fuel is selected from the group consisting of diesel fuel, jet fuel, aviation gasoline, and motor gasoline.

29. The method of claim 1 wherein the liquid hydrocarbon fuel is jet fuel.

30. The method of claim 3 wherein the liquid hydrocarbon fuel is jet fuel.

31. The method of claim 15 wherein the liquid hydrocarbon fuel is jet fuel.

32. The method of claim 16 wherein the liquid hydrocarbon fuel is jet fuel.

33. The method of claim 1 wherein said removable DRA comprises polyalphaolefins comprising polymerized linear alpha olefin (LAO) monomers having from about 2 to about 40 carbon atoms.

34. The method of claim 1 wherein said removable DRA comprises at least two different LAO's having from about 6 to about 12 a carbon atoms, the number of carbon atoms of the at least two different LAO's differing by 6.

35. The method of claim 1 wherein said one or more polar groups comprise a moiety selected from the group consisting of oxygen, sulfur, nitrogen, halogen, phosphorus, unsaturated carbon-carbon bonds other than said single terminal unsaturated carbon-carbon bond, and combinations thereof.

36. The method of claim 3 wherein said one or more polar groups comprise a moiety selected from the group consisting of oxygen, sulfur, nitrogen, halogen, phosphorus, unsaturated carbon-carbon bonds other than said single terminal unsaturated carbon-carbon bond, and combinations thereof.

37. The method of claim 16 wherein said one or more polar groups comprise a moiety selected from the group consisting of oxygen, sulfur, nitrogen, halogen, phosphorus, unsaturated carbon-carbon bonds other than said single terminal unsaturated carbon-carbon bond, and combinations thereof.

38. The method of claim 32 wherein said one or more polar groups comprise a moiety selected from the group consisting of oxygen, sulfur, nitrogen, halogen, phosphorus, unsaturated carbon-carbon bonds other than said single terminal unsaturated carbon-carbon bond, and combinations thereof.

39. The method of claim 1 wherein the polar groups are selected from the group consisting of hydroxyl groups, carbonyl groups, carboxyl groups, ether groups, ester groups, epoxide groups, salts thereof, and combinations thereof.

40. The method of claim 1 wherein the polar groups are selected from the group consisting of constituents of the following general formula:

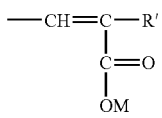

where R' is H or an alkyl group and M is selected from the group consisting of hydrogen, metals, and nitrogen-containing bases.

41. The method of claim 1 wherein the polar groups are selected from the group consisting of thiols, carbonyl sulfides, sulfonic acid groups, sulfonates, sulfonides, and combinations thereof.

42. The method of claim 1 wherein the polar groups are selected from the group consisting of ammonium groups, amine groups, N-substituted amine groups, amide groups, N-substituted amide groups, amidine groups, N-substituted amidine groups, N-acrylamide, N-methacrylamide, N-acrylamidine or N-methacrylamidine, nitrile groups, and combinations thereof.

43. The method of claim 1 wherein the polar groups are selected from the group consisting of N-substituted amides and N-substituted amidines.

44. The method of claim 43 wherein said N-substituted amides and N-substituted amidines comprise an N-substituent comprising one or more polar groups other than a primary amine.

45. The method of claim 1 wherein the polar groups comprise tertiary amines and quaternary ammonium salts.

46. The method of claim 1 wherein the polar groups are selected from the group consisting of N-substituted acrylamide groups and N-substituted methacrylamide groups have the following general formula:

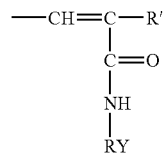

where R' is H or an alkyl and R is an organic substituent with at least one carbon and Y is COOM, —SO$_3$ M or —OSO$_3$ M in which M is selected from the group consisting of hydrogen, metals, and nitrogen-containing bases.

47. The method of claim 1 wherein the polar group comprises a moiety selected from the group consisting of acrylaminidines and methacrylaminidines have the following general formula:

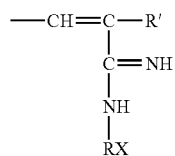

where R' is H or an alkyl and R is an organic substituent with at least one carbon atom and X is H or a non-ionic or ionic substituent.

48. The method of claim 47 wherein said non-ionic substituent is selected from the group consisting of substituents comprising oxygen, alkyl groups having from about 4 to 24 carbon atoms, substituents comprising silicon, nitrogroups, nitroso groups, lactone groups, lactame groups, and nitrile groups.

49. The method of claim 48 wherein said non-ionic substituent comprises a substituents comprising oxygen selected from the group consisting of —OH, —OR, esters, saccharides, epoxides.

50. The method of claim 48 wherein said non-ionic substituent comprises a substituent comprising silicon having the following general structure

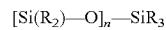

[Si(R$_2$)—O]$_n$—SiR$_3$ where n is from about 0 to about 100 and R is an alkyl having from about 4 to 24 carbons.

51. The method of claim 40 wherein M is selected from the group consisting of primary amines, secondary amines, tertiary amines, quaternary bases, pyridines, naphtyridines, guanidines, amidines, and salts thereof.

52. The method of claim 1 wherein said polar groups are selected from the group consisting of oxygenated phosphorus groups, halogenated phosphorous groups, and combinations thereof.

53. The method of claim 1 wherein said polar groups are selected from the group consisting of phosphine groups, phosphate groups, phosphoric acid groups, and combinations thereof.

54. The method of claim 1 wherein said polar groups are selected from the group consisting of alkenyl groups, alkynyl groups, aromatic groups, diallyl compounds, preferably diallyl ammonium compounds, ethylenically unsaturated carboxylic esters and carboxylic amides and copolymers thereof, and combinations thereof.

55. The method of claim 1 wherein said polar groups are selected from the group consisting of copolymers having structural units derived from monomers which are (A) at least one ethylenically unsaturated alcohol, carboxylic acid or ester, with at least one of (B) an ethylenically unsaturated carboxylic ester with a polar group in the ester, and (C) an ethylenically unsaturated carboxylic amide.

56. The method of claim 55 wherein said the carboxylic acid is selected from the group consisting of mono, di, or tricarboxylic acid.

57. The method of claim 55 wherein the carboxylic acid is selected from the group consisting of fumaric, maleic, and crotonic acids.

58. The method of claim 1 wherein said polar groups are selected from the group consisting of acetate groups, acrylate groups, acrylamide groups, zwitterionic groups, epoxide groups, metal silicate salt groups, alkyl propane sulfonic acid groups, N-sulfoalkyl-N-alkacroyloxyalkyl groups, N,N-dialkyl-ammonium betaine (IV) groups, groups comprising quaternary salts of dialkylamino alkyl alkacrylates, poly (dialkylamino alkylacrylamide) groups, poly (dialkylamino alkylacrylamide) groups, (3-acrylamido-3-alkyl) alkylpolyalkylammonium chloride groups, 2-acrylamido-2-alkylpropane sulfonic acid groups, and dialkyldiallyl ammonium chloride groups, alkyl styrene sulfate groups, carboxyvinyl groups, vinyl acrylamide groups, carboxymethylcellulose groups.

59. The method of claim 1 wherein said polar groups are selected from the group consisting of sodium silicate groups, calcium silicate groups, magnesium silicate groups, iron silicate groups, aluminum silicate groups, alkyl-poly (etheroxy) acrylate groups, methyl propane sulfonic acid groups, N-3-sulfopropyl-N-methacroyloxyethyl-N,N-dimethyl-ammonium betaine (VI) groups, quaternary salts of dimethylamino alkyl methacrylates, quaternary salts of dimethylamino alkylmethacrylamide groups, poly (dimethylamino methylacrylamide) groups, (3-acrylamido-3-methyl) alkylpolyalkylammonium chloride groups, 2-acrylamido-2-methylpropane sulfonic acid groups, and dimethyldiallyl ammonium chloride groups, methyl styrene sulfate groups, carboxyvinyl groups, vinyl acrylamide groups, carboxymethylcellulose groups, hydroxyethylcellulose groups, alkylpoly (etheroxy) acrylate groups, methyl propane sulfonic acid, N-(3-sulfopropyl-N-methacroyloxyethyl-N,N-dimethyl-ammonium) betaine (VI) groups, quaternary salts of dimethylaminoethyl methacrylate and dimethylaminopropyl methacrylamide groups, poly (dimethylamino methylacrylamide) groups, (3-acrylmido-3-methyl) butyltrimethylammonium chloride groups, 2-acrylamido-2-methylpropane sulfonic acid groups, dimethyldiallyl ammonium chloride groups, and methacrylamido propyl trimethyl ammonium chloride, organic electrolyte such as cetyltrimethylammonium salicylate and sodium salicylate; cetyltrimethylammonium 3,4,-dichlorobenzoate and sodium 3,4-dichlorobenzoate; and tetradecyltrimethylammonium salicylate and sodium salicylate.

60. The method of claim 1 wherein said polar groups are selected from the group consisting of zwitterionic groups having the following general structure:

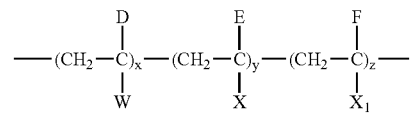

wherein

W is a $CONH_2$ or CONHR or CONRR' or COO or COOR" group, where R, R' and R" are linear or branched aliphatic radicals;

x, y, and z are molar percentages, y+z not equal to zero;

D, E and F are an atom of hydrogen or a methyl group, X and $X_1$ correspond to one of the following two formulas;

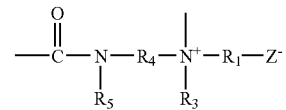

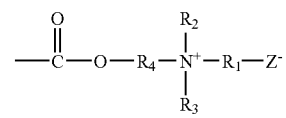

wherein $R_2$ and $R_3$ are each a monovalent hydrocarbon radical;

$R_1$ is a divalent organic group comprising a linear chain consisting of carbon atoms, containing 3 to 12 atoms in linear chain, that can be interrupted by 1 nitrogen atom carrying an amide function or by 1 to 3 oxygen atoms and comprising hydrogen, alkyl or hydroxyl substituents;

$R_4$ is a linear or branched aliphatic group and $R_5$ is a hydrocarbon radical;

Z- meets at least one of the following formulas corresponding to sulfobetaines and phosphobetaines respectively:

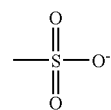

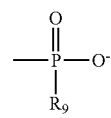

wherein $R_9$ is a methyl, phenyl or alkoxy radical, in cases where synthesis is carried out in the absence of salts, wherein (y+z) is defined by:

$(y+z)max=40\%,$ in the case of phosphobetaines where the synthesis is carried out in the presence of salts, wherein (y+z) is defined by:

(y+z)max=100%.

61. The method of claim 60 wherein $R^1$ is selected from the group consisting of those having the following general formula:

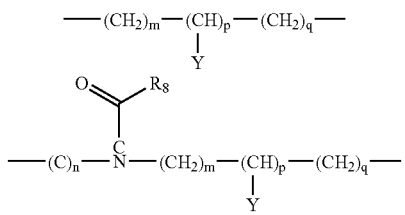

wherein
- $R_8$ is selected from the group consisting of a hydrogen atom and a hydrocarbon radical;
- n is 2 or 3;
- m is from 1 to 4;
- p is from 0 to 1;
- q is from 0 to 1;
- Y is selected from the group consisting of methyl groups and hydroxyl groups; provided that, when Y is a hydroxyl group, p is 1, m is 1 and q is 1, and when Y is a methyl group, p is 1, m is 2 and q is from 0 to 1; and, if p is 0, the sum m+q is 2, 3, or 4.

62. The method of claim 60 wherein $R_1$ is selected from the group consisting of one of the following four formulas:

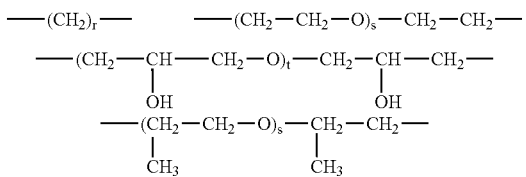

wherein
- r is an integer between 3 and 12;
- s is an integer between 1 and 3; and,
- t is an integer that can be 1 or 2.

63. The method of claim 1 wherein said polar groups have the following general formula:

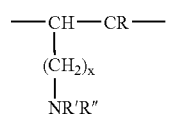

wherein
- R, R', and R" are selected from the group consisting of hydrogen and alkyl groups; and,
- x is from about 0 to about 40.

64. A method for increasing removal of DRA from liquid hydrocarbon fuel, said method comprising:
producing contaminated liquid hydrocarbon fuel comprising a concentration of removable DRA comprising a quantity of one or more polar groups other than a single unsaturated terminal carbon-carbon bond; and,
contacting said contaminated liquid hydrocarbon fuel with an amount of one or more removal agents under removal conditions effective to remove 60% or more of said removable DRA from said contaminated liquid hydrocarbon fuel, producing a reduced concentration of said removable DRA.

65. The method of claim 64 wherein said one or more removal agents selected from the group consisting of activated carbons, graphites, attapulgus clay, and combinations thereof.

66. The method claim 64 wherein said one or more effective removal agents comprise activated carbon.

67. The method of claim 64 wherein said one or more effective removal agent comprise attapulgus clay.

68. The method of claim 64 wherein said one or more effective removal agents comprise graphite.

69. The method of claim 66 wherein the liquid hydrocarbon fuel has a boiling range of from about 150° F. to about 750° F.

70. The method of claim 67 wherein the liquid hydrocarbon fuel has a boiling range of from about 150° F. to about 750° F.

71. The method of claim 68 wherein the liquid hydrocarbon fuel has a boiling range of from about 150° F. to about 750° F.

72. The method of claim 66 wherein the liquid hydrocarbon fuel is selected from the group consisting of diesel fuel, jet fuel, aviation gasoline, and motor gasoline.

73. The method of claim 67 wherein the liquid hydrocarbon fuel is selected from the group consisting of diesel fuel, jet fuel, aviation gasoline, and motor gasoline.

74. The method of claim 68 wherein the liquid hydrocarbon fuel is selected from the group consisting of diesel fuel, jet fuel, aviation gasoline, and motor gasoline.

75. The method of claim 66 wherein the liquid hydrocarbon fuel is jet fuel.

76. The method of claim 67 wherein the liquid hydrocarbon fuel is jet fuel.

77. The method of claim 68 wherein the liquid hydrocarbon fuel is jet fuel.

* * * * *